(12) United States Patent
Jang

(10) Patent No.: US 12,134,063 B2
(45) Date of Patent: Nov. 5, 2024

(54) DUST REMOVAL DEVICE USING EXPANSION PRESSURE

(71) Applicant: Hyobin Jang, Goyang-si (KR)

(72) Inventor: Hyobin Jang, Goyang-si (KR)

( * ) Notice: Subject to any disclaimer, the term of this patent is extended or adjusted under 35 U.S.C. 154(b) by 379 days.

(21) Appl. No.: 17/609,032

(22) PCT Filed: May 20, 2020

(86) PCT No.: PCT/KR2020/006603
§ 371 (c)(1),
(2) Date: Nov. 5, 2021

(87) PCT Pub. No.: WO2020/242119
PCT Pub. Date: Dec. 3, 2020

(65) Prior Publication Data
US 2022/0212135 A1 Jul. 7, 2022

(30) Foreign Application Priority Data

May 30, 2019 (KR) .................. 10-2019-0063906

(51) Int. Cl.
*B01D 49/00* (2006.01)
*A47L 9/16* (2006.01)
(Continued)

(52) U.S. Cl.
CPC ............ *B01D 49/00* (2013.01); *A47L 9/1683* (2013.01); *B01D 45/06* (2013.01); *B01D 47/021* (2013.01); *B01D 47/024* (2013.01)

(58) Field of Classification Search
CPC ........ B01D 47/02; B01D 49/00; B01D 45/02; B01D 45/04; B01D 45/06; B01D 47/021; B01D 47/024; A47L 9/1683; A47L 9/125
(Continued)

(56) References Cited

U.S. PATENT DOCUMENTS 3,867,115 A * 2/1975 Heintzelman .......... B01D 45/06
55/435
6,062,547 A * 5/2000 Nilsson ............... D21C 11/0071
55/342
(Continued)

FOREIGN PATENT DOCUMENTS

JP      H10-508245 A    8/1998
JP      2017-087132 A    5/2017
(Continued)

*Primary Examiner* — Bryan R Muller
(74) *Attorney, Agent, or Firm* — KORUS Patent, LLC; Seong Il Jeong

(57) ABSTRACT

The present invention discloses a dust removal device using expansion pressure. A dust removal device using expansion pressure according to one embodiment may comprise an inlet chamber allowing mixed air including dust to flow inside and including an outlet for discharging the dust downward; a dust collecting chamber disposed at a bottom of the inlet chamber and sealed in a state of communicating with the inlet chamber and the outlet to collect the dust discharged through the outlet; a supplying pipe entering into an inside of the inlet chamber and extending toward the outlet to supply the mixed air into the inlet chamber; a first blower providing a blowing force for sucking in the mixed air and supplying the mixed air through the supplying pipe; an air exhaust duct connected to communicate with the inlet chamber to guide air separated from the dust to be discharged to outside, wherein a communication part of the air exhaust duct, which communicates with the inlet chamber, has a certain size allowing the inlet chamber to generate an expansion pressure inside, and a second blower providing a blowing force to discharge the air inside the inlet chamber to the outside through the air exhaust duct, wherein the supplying pipe and the outlet are spaced apart from each other, and a separation distance between the supplying pipe and the outlet is longer than a range that the mixed air (Continued)

propelled from the supplying pipe can reach to, so that the expansion pressure of the mixed air supplied to the inlet chamber accelerates separation action caused by specific gravity difference between the air and the dust.

3 Claims, 4 Drawing Sheets

(51) Int. Cl.
*B01D 45/06* (2006.01)
*B01D 47/02* (2006.01)

(58) Field of Classification Search
USPC ........ 55/355, 319; 15/353; 96/243, 289, 329
See application file for complete search history.

(56) References Cited

U.S. PATENT DOCUMENTS

| | | | | |
|---|---|---|---|---|
| 2002/0174960 | A1* | 11/2002 | Guatelli | B01D 1/305 |
| | | | | 159/48.1 |
| 2010/0043365 | A1* | 2/2010 | Fujiyama | B04C 5/12 |
| | | | | 55/426 |
| 2018/0223200 | A1* | 8/2018 | Zhou | C10J 3/845 |

FOREIGN PATENT DOCUMENTS

| | | | | |
|---|---|---|---|---|
| KR | 20-0423775 Y1 * | 8/2006 | ............ | B65G 53/04 |
| KR | 10-1511304 B1 * | 4/2015 | ............ | B01D 47/02 |
| WO | 2013/034271 A1 | 3/2013 | | |

* cited by examiner

DUST REMOVAL DEVICE USING EXPANSION PRESSURE

FIELD OF THE INVENTION

The present invention relates to a dust removal device using expansion pressure that separates and removes dust from air by accelerating the difference in specific gravity between dust and air by using the expansion pressure inside the device according to the inflow of mixed air mixed with dust including fine dust.

BACKGROUND OF THE INVENTION

In the field of dust removal device, a method of filtering out dust using a filter is widely known.

However, the filter-type dust removal device has a limitation in continuously performing air purification function for a long time because the filter must be frequently washed or replaced to prevent deterioration of air purification performance caused by the dust accumulated on the filter.

DETAILED DESCRIPTION OF THE INVENTION

Technical Problems

The object of the present invention is to provide a dust removal device using expansion pressure that can continuously and stably purify air for a long time without using a filter.

SUMMARY OF THE INVENTION

A dust removal device using expansion pressure according to one embodiment comprises an inlet chamber allowing mixed air including dust to flow inside and including an outlet for discharging the dust downward; a dust collecting chamber disposed at a bottom of the inlet chamber and sealed in a state of communicating with the inlet chamber and the outlet to collect the dust discharged through the outlet; a supplying pipe entering into an inside of the inlet chamber and extending toward the outlet to supply the mixed air into the inlet chamber; a first blower providing a blowing force for sucking in the mixed air and supplying the mixed air through the supplying pipe; an air exhaust duct connected to communicate with the inlet chamber to guide air separated from the dust to be discharged to outside, wherein a communication part of the air exhaust duct, which communicates with the inlet chamber, has a certain size allowing the inlet chamber to generate an expansion pressure inside, and a second blower providing a blowing force to discharge the air inside the inlet chamber to the outside through the air exhaust duct, wherein the supplying pipe and the outlet are spaced apart from each other, and a separation distance between the supplying pipe and the outlet is longer than a range that the mixed air propelled from the supplying pipe can reach to, so that the expansion pressure of the mixed air supplied to the inlet chamber accelerates separation action caused by specific gravity difference between the air and the dust.

At least one of the inlet chamber and the dust collecting chamber may have a truncated cone shape that at least a portion thereof adjacent to the outlet decreases in diameter as the portion is closer to the outlet.

The dust removal device further comprises an injection hole for injecting cleaning agent, which is capable of open and close, is provided at one side of an upper portion of the dust collecting chamber; a stirrer for stirring the cleaning agent and the dust, which is rotated by a motor, is provided at a bottom of the dust collecting chamber, and a discharge hole for discharging a mixture of the dust and the cleaning agent, which is capable of open and close, is provided at the bottom of the dust collecting chamber.

The air exhaust duct includes: an external duct provided at an outer side of an upper portion of the inlet chamber, and an internal duct provided to communicate with the external duct at an inner side of the upper portion of the inlet chamber, wherein the internal duct is provided such that a bottom of the internal duct is opened with a certain size and disposed along a circumference of the upper portion of the inlet chamber.

Technical Effects of the Invention

According to the dust removal device using expansion pressure according to one embodiment, the expansion pressure of mixed air introduced to an inlet chamber, which is caused by separation distance between a supplying pipe and an outlet, accelerates separation action between the air and the dust caused by difference in specific gravity therebetween. With this device, the dust can be smoothly separated and removed from the air without a filter, thereby allowing the device to perform air purification function continuously, stably for a long time.

BEST MODE FOR THE INVENTION

Figure 1:
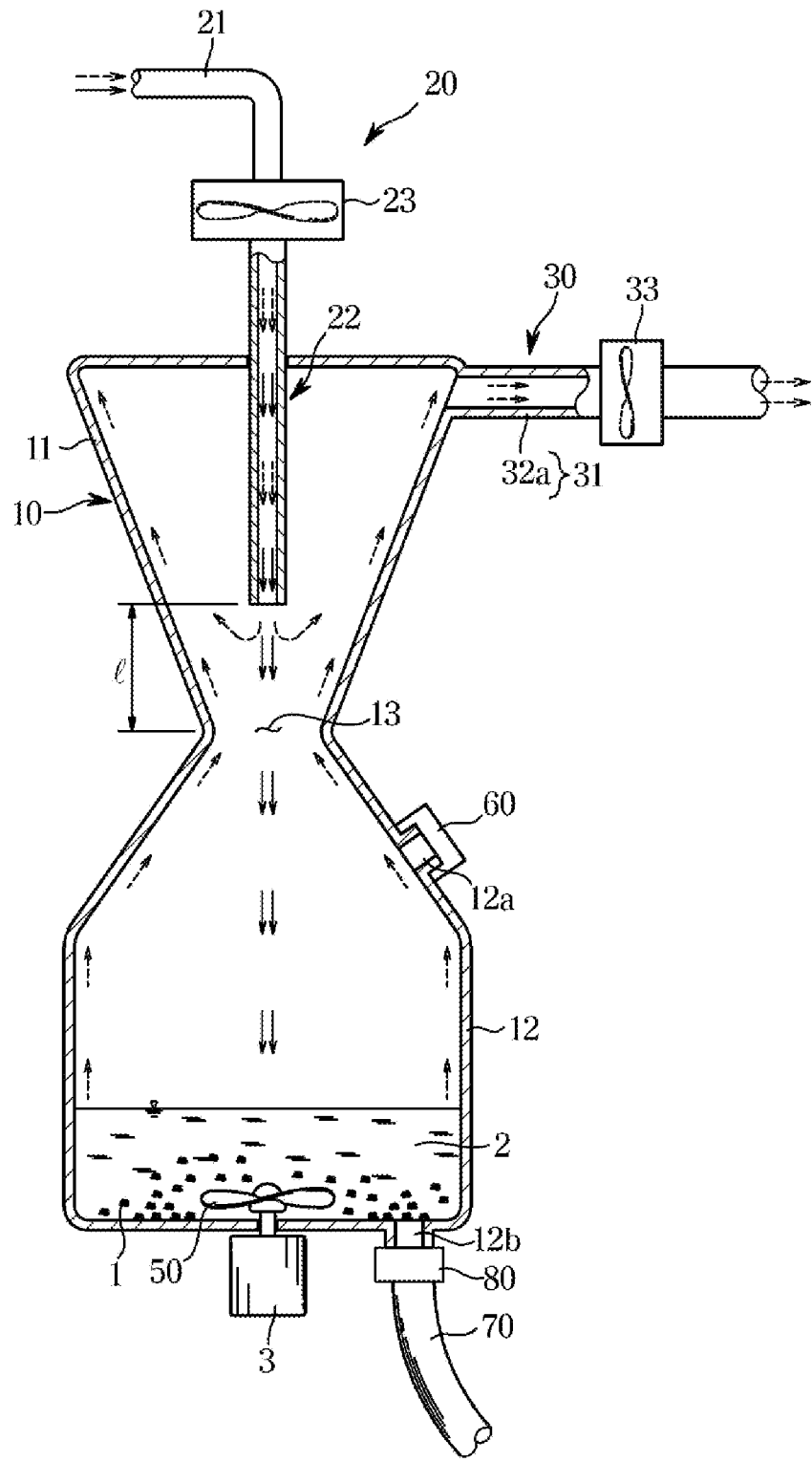
FIG. 1 is a cross-sectional view illustrating a process in which dust is separated from air through flow of air and dust according to one embodiment of the dust removal device using expansion pressure.

Hereinafter, embodiments of the present invention will be described in detail with reference to the accompanying drawings. The embodiments introduced below are provided as examples in order to sufficiently convey the spirit of the present invention to one of ordinary skill in the art to which the present invention pertains. The present invention is not limited to the embodiments described below and may be embodied in other forms. In order to clearly explain the present invention, parts irrelevant to the description are omitted from the drawings. In addition, the width, length, and thickness of components may be exaggerated for convenience in the drawings. The same reference numbers are used to refer to the same components throughout the description.

As illustrated in FIG. 1, dust removal device using expansion pressure according to one embodiment comprises a chamber unit 10, an intake unit 20 for supplying external air into the chamber unit 10, and an exhaust unit 30 for discharging air inside the chamber unit 10 to the outside.

The chamber unit 10 may include an inlet chamber 11 in the upper portion and a dust collecting chamber 12 in the lower portion. The inlet chamber 11 and the dust collecting chamber 12 may be provided to be sealed, respectively, communicating with each other through an outlet 13 at the bottom of the inlet chamber 11 therebetween.

The intake unit 20 includes a suction pipe 21 sucking in external mixed air in which dust containing fine dust and air are mixed, a supplying pipe 22 supplying the sucked mixed air into the inlet chamber 11, and a first blower 23 providing blowing force for sucking in the mixed air through the suction pipe 21 and supplying it through the supplying pipe 22.

The first blower 23 may be variously modified within a range capable of sucking in the mixed air and supplying the mixed air into the inlet chamber 11 through the supplying pipe 22.

Thus, the first blower 23 may be configured as various types of blowers using ejectors or venturi tubes as well as fans, and may be installed inside the inlet chamber 11, such as the middle of the supplying pipe 22.

The suction pipe 21 may be rotatably coupled to the first blower 23 by 360 degrees or may be connected allowing an angle control, so that the suction direction of outside air can be variously adjusted.

The supplying pipe 22 may be vertically coupled to the upper inlet chamber 11 in a such a way that the tip of the supplying pipe 22 is extended from the center of the inlet chamber 11 toward the outlet 13 so that the supplying pipe 22 enters the inlet chamber 11.

The exhaust unit 30 includes an air exhaust duct 31 guiding the discharge of air coming from the inlet chamber 11, and a second blower 33 providing blowing force to discharge the air inside the inlet chamber 11 through the air exhaust duct 31.

The air exhaust duct 31 includes an external duct 32*a* extending to one outer side of the inlet chamber 11 to communicate with the inside of the inlet chamber 11, and in this instance, the second blower 33 may be installed in the middle of the air exhaust duct 31.

As the second blower 33, various blowing methods may be employed within a range capable of providing blowing force so that the air inside the inlet chamber 11 is discharged to the outside through the air exhaust duct 31.

Meanwhile, the supplying pipe 22 has a supplying port 22*a* at the end of the supplying pipe 22, and the supplying port 22*a* is provided to be spaced apart from the outlet 13 on the upper portion of the outlet 13, so that dust in the mixed air discharged through the supplying pipe 22 is separated from the mixed air by specific gravity difference with air and guided to the lower dust collecting chamber 12. Reference mark 1 denotes the separation distance between the supplying port 22*a* and the outlet 13.

As described above, in the structure in which the supplying pipe 22 is spaced apart from the outlet 13 at the upper portion of the outlet 13, the range of the mixed air discharged through the supplying pipe 22 does not go beyond the outlet 13, and thus, separation action between air and dust caused by specific gravity difference therebetween can be accelerated by expansion pressure of the mixed air discharged to the inlet chamber 11.

That is, when the mixed air with a certain pressure is shot downwardly into the inlet chamber 11 through the supplying pipe 22, the volume inside the inlet chamber 11 is increased by the injected mixed air and thus, an expansion pressure is generated inside the inlet chamber 11. In this instance, the mixed air propelled through the supplying pipe 22 has a range to which the force of the propelled mixed air allows the mixed air to reach. As described above, the separation distance 1 between the supplying pipe 22 and the outlet is longer than this range so that the range is limited to the upper portion of the outlet 13. Accordingly, there is no more force in the mixed air existing around the outlet 13 to go beyond the outlet 13 in the propelled direction, but the mixed air has only an expansion pressure force trying to escape from the inside of the inlet chamber 11. When this expansion pressure acts on the mixed air having dust particles and air particles mixed, the expansion pressure accelerates the specific gravity difference according to the weights of dust and air particles. Accordingly, the dust particles have a higher specific gravity than that of air particles, the dust particles with heavy weight are disposed in the lower portion of the inlet chamber 11, and the air particles having relatively light weight are disposed in the upper portion of the inlet chamber 11. Therefore, the heavy dust particles are propelled downward to the outlet 13 and discharged, and the light air particles are pushed out from the outlet 13 due to the specific gravity difference and is disposed upward by the inner wall of the inlet chamber 11. In this way, the separation action between the dust and the air is accelerated by the specific gravity difference between the dust particles and the air particles. As a result, the air in the mixed air rises along the inner wall of the inlet chamber 11 through the expansion pressure and is discharged to the outside of the inlet chamber 11 through the air exhaust duct 31, and the dust having a higher specific gravity than the air is propelled downwardly by the expansion pressure and can be collected in the dust collecting chamber 12 in a state separated from the air. In this instance, the dust may include fine dust and various foreign substances, which have a higher specific gravity than the air. In the drawing, a solid line arrow denotes a flow of dust, and a dashed line arrow denotes a flow of air.

The inlet chamber 11 may have an upside-down truncated cone shape in which at least a lower portion thereof adjacent to the outlet 13 decreases in diameter toward the outlet 13, so that the air separated from the dust can be smoothly guided toward the upper portion of the inlet chamber 11. In this embodiment, the inlet chamber 11 is provided in a form of a truncated cone as a whole whose diameter decreases as it goes down to the bottom thereof.

Figure 3:
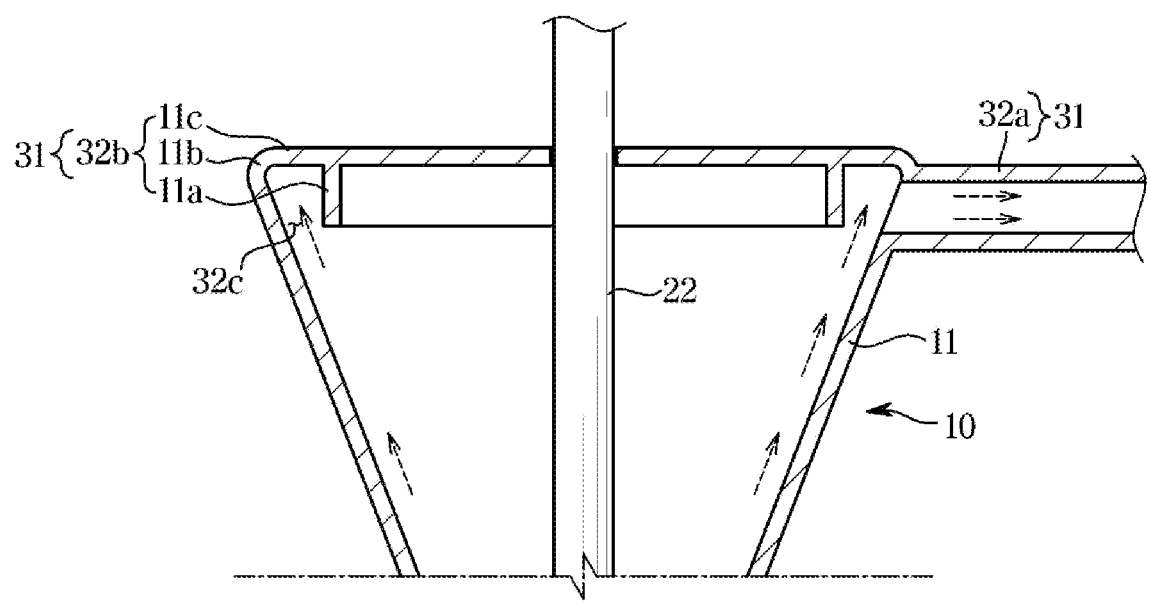
FIG. 3 is a cross-sectional view of a main portion of the device according to another embodiment of the dust removal device using expansion pressure.
Figure 4:
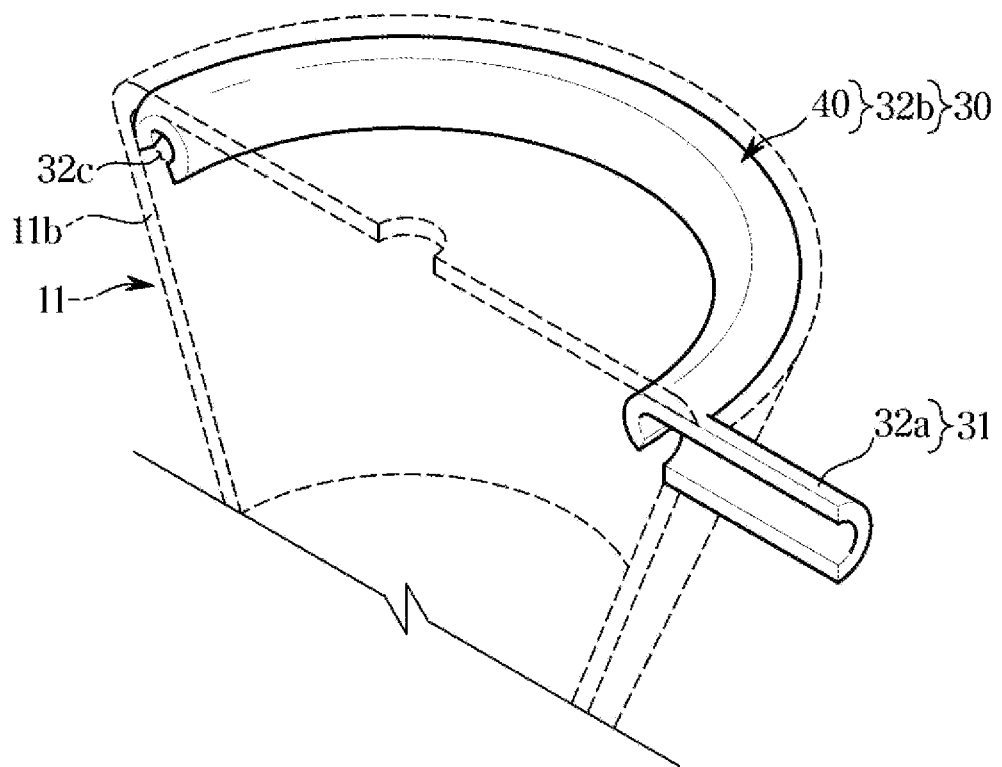
FIG. 4 is a perspective view of a main portion of the device according to another embodiment of the dust removal device using expansion pressure.

As FIGS. 3 and 4 illustrating modified examples of the dust removal device according to the embodiment above, the air exhaust duct 31 may include an external duct 32*a* provided at an outer side of the upper portion of the inlet chamber 11 and connected to the inlet chamber 11 to communicate through a communication part having a certain size, which allows expansion pressure to be generated inside the inlet chamber 11, and an internal duct 32*b* provided to communicate with the external duct 32*a* at the inner side of the upper portion of the inlet chamber 11. The internal duct 32*b* may be provided such that the bottom thereof is opened with a certain size and disposed along the circumference of the upper portion of the inlet chamber 11. Reference number 32*c* denotes an air inlet groove with a certain size, which is formed along the circumference of the internal duct 32*b* at the bottom of the inner duct 32*b* to guide the air into the internal duct 32*b*.

According to the structure of the air exhaust duct 31 as described above, the air moving upward along the inner wall of the inlet chamber 11 is guided into the internal duct 32*b* through the air inlet groove 32*c*, collected in the internal duct 32b, and can be more smoothly discharged to the outside of the inlet chamber 11 through the external duct 32a.

The inner duct 32b may be embodied simply by adding an extended wall 11a extending from a top wall 11c of the inlet chamber 11.

In other words, as shown in FIG. 3, when the extended wall 11a extending downward from the top wall 11c to the inside of a sidewall 11b of the upper portion of the inlet chamber 11 is added along the circumference of the inlet chamber 11 with a certain length, the internal duct 32b opened downward with a certain size can be easily formed through a space defined by the extended wall 11a, the sidewall 11b on the opposite side of the extended wall 11a, and the top side 11c connecting between the extended wall 11a and the sidewall 11b.

In addition, as shown in FIG. 4, the inner duct 32b may be provided by a separate connection pipe 40, which is installed inside the inner side of the upper portion of the inlet chamber 11 and connected to the external duct 32a.

In this instance, the connection pipe 40, of which the bottom is opened downwardly with a certain size to form an air inlet groove 32c along the circumference of the inlet chamber 11, is installed inside the inlet chamber 11 so that the outer circumferential wall of the air inlet groove 32c is supported by the sidewall 11b of the inlet chamber 11.

In addition, the air inside the dust collecting chamber 12 moves upward by the suction force according to the blowing action of the second blower 33, is guided to the air discharge duct 31 together with the air from the mixed air, and discharged to the outside. Accordingly, the sealed dust collecting chamber 12 maintains a vacuum state and thus generates a suction force, thereby inducing the dust entering the dust collecting chamber 12 by the suction force to be more stably collected and accumulated on the floor of the dust collecting chamber 12.

In order to smoothly guide the air of the dust collecting chamber 12 toward the inlet chamber 11, the dust collecting chamber 12 has a truncated cone whose diameter decreases toward the outlet 13 on at least an upper portion adjacent to the outlet 13.

In this embodiment, the dust collecting chamber 12 is provided as a truncated cone shape in which the upper portion stands upright to easily guide rising air, and the lower portion is provided as a cylindrical shape with a constant diameter to secure sufficient space for collecting dust.

In addition, an injection hole 12a for injecting cleaning agent 2, which is capable of open and close, is provided at one side of the upper portion of the dust collecting chamber 12. Furthermore, a stirrer 50 rotated by a motor 3 and a discharge hole 12b capable of open and close, may be provided at the bottom of the dust collecting chamber 12.

As the cleaning agent 2, various liquid chemicals having dust adsorption properties may be used, and the injection hole 12a may be opened and closed through a stopper 60.

The stirrer 50 may be disposed at the center of the floor of the dust collecting chamber 12, and the stirrer 50 may be coupled to the shaft of the motor 3 to rotate by operation of the motor 3 installed at the bottom of the dust collecting chamber 12.

The discharge hole 12b may be formed at one side of the floor of the dust collection chamber 12 to communicate with a connection pipe 70 connected to a drain. An on/off valve 80 may be provided between the discharge hole 12b and the connection pipe 70 to open and close of the discharge hole 12b.

Figure 2:
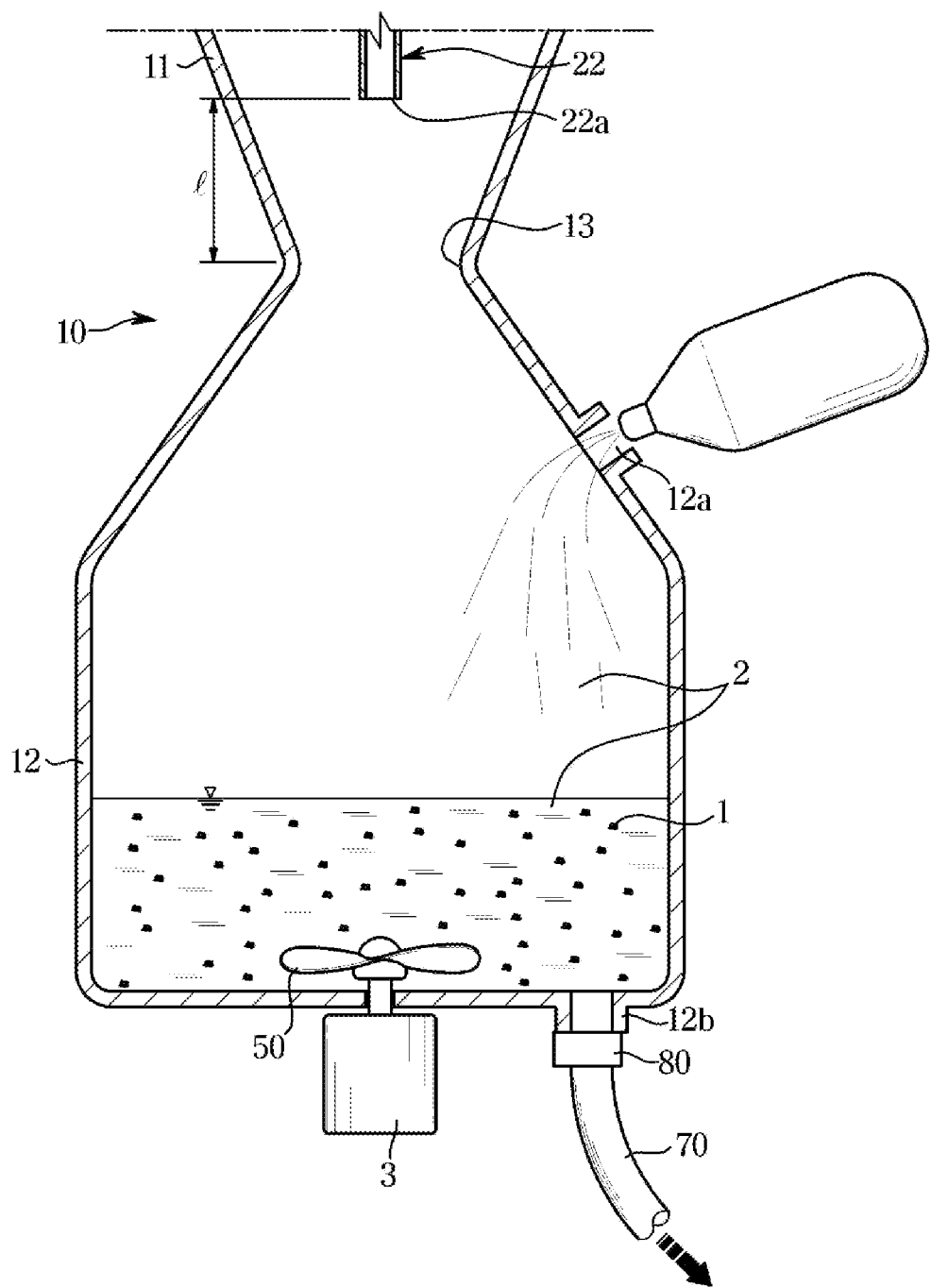
FIG. 2 is a cross-sectional view of a main portion of the device illustrating a process in which dust collected in a dust collection chamber dissolves in a cleaning agent and is discharged to the outside according to one embodiment of the dust removal device using expansion pressure.

Therefore, as shown in FIG. 2, with operation of the stirrer 5 by driving the motor 3 in the state in which the cleaning agent 2 is injected into the dust collecting chamber 12, the dust collecting chamber 12 can be maintained the vacuum state, and thus, the dust particles accumulated on the floor of the dust collection chamber 12 are continuously dissolved into the cleaning agent 2, which circulates at the bottom portion of the dust collection chamber 12.

After a certain time has elapsed, the user can remove the accumulated dust 1 by controlling the on/off valve 80 so that the discharge hole 12b is opened to discharge the cleaning agent 2, in which the accumulated dust 1 has dissolved, to the drain. It can be easily removed to the outside of the device by allowing it to drain through the sewer. In this instance, the cleaning agent 2 may be replaced with a new one and filled again.

The following describes the operation of the dust removal device configured as described above.

As shown in FIG. 1, when the first blower 23 and the second blower 33 are driven, the external air, which the dust is mixed with, flows into the inlet chamber 11 through the suction pipe 21 and the supplying pipe 22.

In this instance, since the separation distance 1 between the supplying pipe 22 and the outlet 13 is provided longer than the range that the mixed air propelled from the supplying pipe 22 can reach to, the range of the mixed air propelled from the supplying pipe 22 is limited to the upper portion of the outlet 13. Therefore, the expansion pressure inside the inlet chamber 11 contributes to the air from the mixed air rising along the inner wall of the inlet chamber 11, thereby accelerating the separation action between the air particles and the dust particles falling by their own weight. Accordingly, the rising air is discharged to the outside of the inlet chamber 11 along the air exhaust duct 31 by the suction force of the second blower 33. The dust 1 with a higher specific gravity than the air is launched downwardly by the expansion pressure, passes through the outlet 13 in a state in which the dust 1 is separated from the air, and is collected in the lower portion of the dust collecting chamber 12.

At this time, the air inside the dust collecting chamber 12 moves upward by the suction force according to the blowing action of the second blower 33 and is discharged through the air exhaust duct 33 together with the air coming from the supplying pipe 22, thereby allowing the dust collecting chamber 12 to be maintained in a vacuum state.

Therefore, the suction force by the vacuum state is formed in the dust collecting chamber 12, and this suction force promotes and stabilizes the dust 1, which is separated from the air and enters the dust collecting chamber 12, to be collected and accumulated at the floor of the dust collecting chamber 12.

In addition, the dust 1 collected on the floor of the dust collecting chamber 12 is stored inside the dust collecting chamber 12 and continuously dissolves in the cleaning agent 2 by the operation of the stirrer 50. The dust 1 can be removed by discharging it to the drain together with the cleaning agent 2 by controlling the on-off valve 80 to open the discharge hole 12b.

DESCRIPTION OF REFERENCE NUMBER

11: Inlet Chamber
12: Dust Collecting Chamber
12a: Injection Hole
12b: Discharge Hole
13: Outlet
22: Supplying Pipe 23: First Blower
31: Air Exhaust Duct
33: Second Blower
50: Stirrer

What is claimed is:

1. A dust removal device using pressure, the dust removal device comprising:
   an inlet chamber allowing mixed air including dust to flow inside and including an outlet for discharging the dust downward;
   a dust collecting chamber disposed at a bottom of the inlet chamber and sealed in a state of communicating with the inlet chamber at the outlet to collect the dust discharged through the outlet;
   a supplying pipe entering into an inside of the inlet chamber and having a distal end within the inlet chamber and extending toward the outlet to supply the mixed air into the inlet chamber;
   a first blower providing a blowing force for sucking the mixed air into the supplying pipe and supplying the mixed air through the supplying pipe;
   an air exhaust duct connected to communicate with the inlet chamber to guide air separated from the dust to be discharged to outside, and
   a second blower providing a blowing force to discharge the air inside the inlet chamber to the outside through the air exhaust duct,
   wherein the distal end of the supplying pipe and the outlet are spaced apart from each other by a separation distance between the supplying pipe and the outlet so that the pressure of the mixed air supplied to the inlet chamber accelerates separation action caused by specific gravity difference between the air and the dust,
   wherein the dust collecting chamber has a truncated cone shape that a portion thereof adjacent to the outlet decreases in diameter as the portion is closer to the outlet,
   wherein an injection hole for injecting cleaning agent, which is capable of being opened and closed, is provided at one side of an upper portion of the dust collecting chamber,
   wherein the air exhaust duct comprises:
   an external duct provided at an outer side of an upper portion of the inlet chamber,
   an internal duct provided to communicate with the external duct, the internal duct positioned at an inner side of the upper end of the inlet chamber and disposed along a circumference of the upper end of the inlet chamber, and
   an air inlet groove formed along a circumference of the internal duct at a bottom of the internal duct to guide the air into the internal duct.

2. The dust removal device of claim 1, wherein the inlet chamber has a truncated cone shape that a portion thereof adjacent to the outlet decreases in diameter as the portion is closer to the outlet.

3. The dust removal device of claim 1, further comprising:
   a stirrer for stirring the cleaning agent and the dust, which is rotated by a motor and is provided at a bottom of the dust collecting chamber, and
   a discharge hole for discharging a mixture of the dust and the cleaning agent, which is capable of being opened and closed and is provided at the bottom of the dust collecting chamber.

* * * * *